United States Patent [19]
Campbell et al.

[11] Patent Number: 5,263,386
[45] Date of Patent: Nov. 23, 1993

[54] ROLLER CAM FOLLOWER GUIDE

[75] Inventors: Darryl J. Campbell, Algonac; Creighton A. Mantey, Jr., Dryden, both of Mich.; Richard C. Pickelhaupt, Tonawanda, N.Y.; Guy E. Giannone, Bergen, N.Y.; Rick C. Wirth, Henrietta, N.Y.

[73] Assignee: General Motors Corporation, Detroit, Mich.

[21] Appl. No.: 981,117

[22] Filed: Nov. 24, 1992

[51] Int. Cl.$^5$ .............. F16H 53/06; F01L 1/14; B25G 3/28; F16B 21/18

[52] U.S. Cl. ..................... 74/569; 403/355; 411/517; 411/521; 123/90.5; 123/90.18

[58] Field of Search ............ 403/355; 411/517, 521; 74/569, 55; 123/90.5, 90.48, 90.51, 90.60, 90.18

[56] References Cited

U.S. PATENT DOCUMENTS

| | | | |
|---|---|---|---|
| 2,846,988 | 8/1958 | Iskenderian | 123/90 |
| 2,896,287 | 7/1959 | Stultz | 411/521 |
| 3,101,077 | 8/1963 | Engle | 123/90.5 |
| 3,267,919 | 8/1966 | Wortman | 123/90 |
| 3,795,229 | 3/1974 | Weber | 123/90.5 |
| 3,886,808 | 6/1975 | Weber | 74/569 |
| 4,326,484 | 4/1982 | Amrhein | 123/90.5 |
| 4,584,976 | 4/1986 | Hillebrand | 123/90.5 |
| 4,627,761 | 12/1986 | Olson et al. | 411/517 |
| 4,771,741 | 9/1988 | Leer | 123/90.5 |
| 4,775,273 | 10/1988 | Bauer | 411/517 |
| 4,793,295 | 12/1988 | Downing | 123/90.55 X |
| 4,809,651 | 3/1989 | Gerchow et al. | 123/90.5 |
| 5,188,067 | 2/1993 | Fontichiaro et al. | 123/90.5 |

FOREIGN PATENT DOCUMENTS

| | | | |
|---|---|---|---|
| 254559 | 9/1911 | Fed. Rep. of Germany | 411/517 |
| 904293 | 8/1962 | United Kingdom | 411/517 |

Primary Examiner—Vinh T. Luong
Attorney, Agent, or Firm—Robert J. Outland

[57] ABSTRACT

A roller cam follower, especially an engine hydraulic roller lifter, is restrained from rotation away from a position in which the roller rotates squarely on its associated cam by a retainer clip fixed on the lifter body and having a tang with flat sides engaging an axial groove in an associated bore of the engine lifter gallery. The retainer clip is a closed ring with opposite flexible hat sections connected by arches having inner edges that snap into a groove on the lifter body. The inner edges are preferably angled upward to aid installation and the hat sections preferably have squared inner ends that engage flats on the lifter body to prevent relative rotation of the body and clip.

15 Claims, 2 Drawing Sheets

ROLLER CAM FOLLOWER GUIDE

TECHNICAL FIELD

This invention relates to guided roller cam followers (roller followers) as used, for example, in engines such as in valve lifters or tappets (roller lifters), injectors or injection pump followers and the like, and particularly, but not exclusively, to hydraulic valve lifters (roller hydraulic lifters), also known as tappets or lash adjusters, of the roller follower type.

BACKGROUND

It is known in the art relating to roller lifters to provide guide means acting between the lifter body and an adjacent lifter or stationary engine component to prevent substantial rotation of the lifter around its axis of reciprocation. The guide means thus prevent the lifter from turning away from a selected position wherein the roller squarely rides on the surface of its respective cam.

Some of the prior arrangements require additional parts and added steps during engine assembly which increase the cost of the product. Also, arrangements useful for engines having their lifter bores in aligned banks may not be applicable where the lifters reciprocate on non-aligned axes.

SUMMARY OF THE INVENTION

The present invention provides an improved lifter guide system and assembly in which a spring retainer clip is mounted on a groove in the lifter body and is positioned by engagement with flats to maintain a fixed circumferential orientation. A formed tang on the clip rides in a slot formed in a wall of the lifter gallery to prevent relative rotation of the lifter in its bore.

The retainer clip is preferably made of formed spring steel and is shaped to snap into the groove for positive retention on the lifter. oppositely arched sections include gripping portions which may be angled upward to form a lead-in chamfer and/or stiffen the arched portions to provide easier mounting onto the body. Opposite hat sections between the arched portions allow flexing of the clip for installation and at least one of the hat sections is extended to form the tang to include parallel wall portions that engage the lifter gallery slot with a large area of plane contact for low wear.

The lifter bore may be counterbored and/or the lifter body diameter may be reduced toward the top to provide clearance for the clip to ride on the body within the bore. If the clearance between the bore and the clip as installed is maintained sufficiently small, the bore can act as redundant means to retain the clip in the groove by preventing it from opening far enough to escape.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
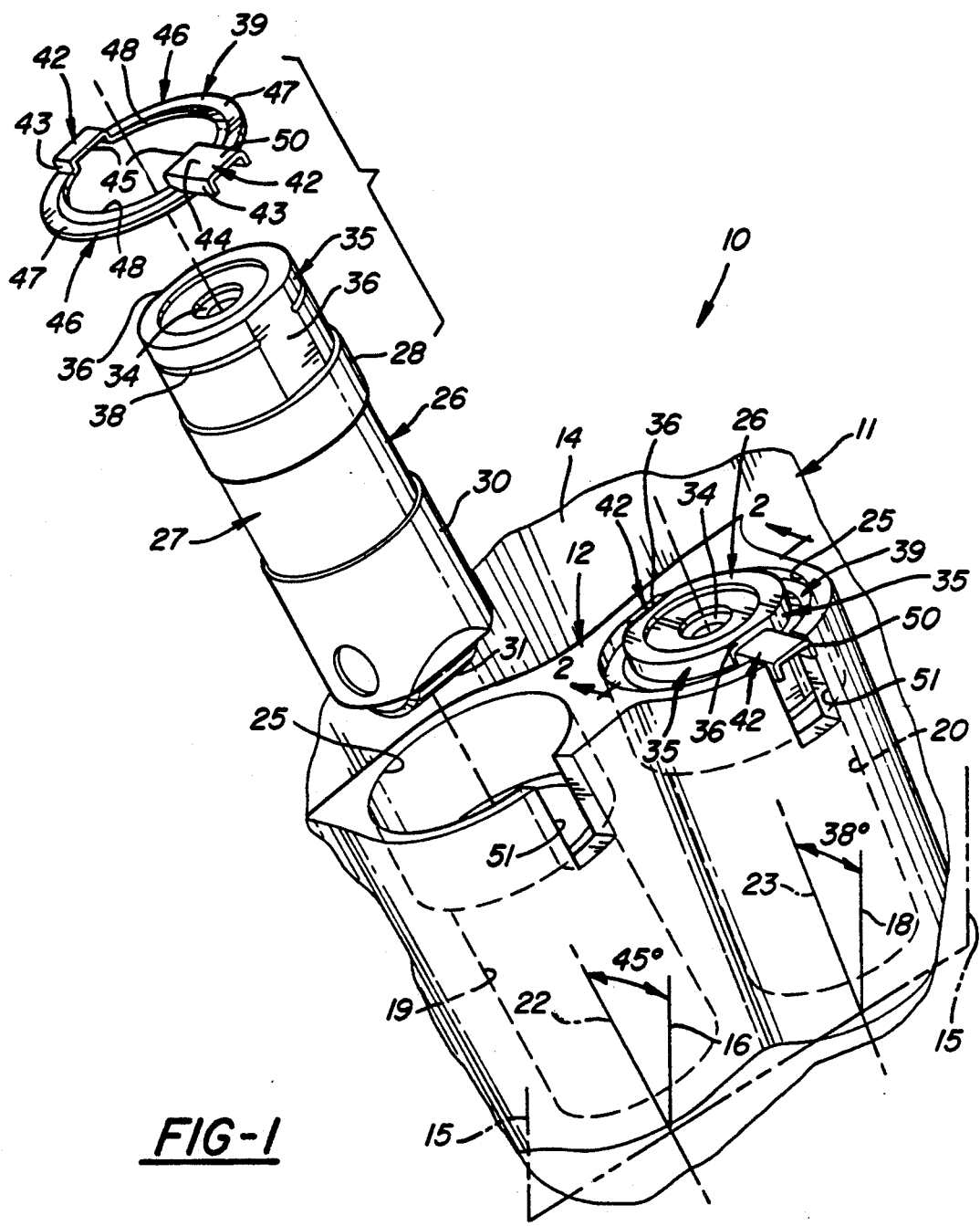
FIG. 1 is a pictorial view partially exploded showing an engine having guided roller hydraulic lifters according to the invention.

Referring now to the drawings in detail, numeral 10 generally indicates a preferred but not a limiting embodiment of an internal combustion engine having a V-type cylinder block 11 including a lifter gallery 12 located on an inner wall of a cylinder bank 14. Two banks, only one of which is shown, are disposed oppositely at 45° angles from the central vertical plane 15 located between the banks and defined by parallel lines 16, 18 in FIG. 1.

The lifter gallery includes a plurality of lifter bores 19, 20 related to the engine exhaust and inlet valves and centered on axes 22, 23, respectively. These axes are conventionally disposed normal to the axis of a camshaft 24. The upper portions of the bores 19, 20 are counterbored as at 25 for a purpose to be later described.

The axes 22 of the exhaust valve lifter bores 19 lie parallel with the cylinders in their associated cylinder banks at 45° from the central plane 15. However, the inlet valve lifter bores 20 have their axes 23 disposed at angles of 38° 45' from the central plane 15. Thus, the inlet and exhaust lifter bores for each cylinder, and especially the counterbored upper ends 25, are staggered longitudinally even though the lifter bores 19 related to the various cylinders of each bank are longitudinally aligned as are the corresponding bores 20.

Within each of the lifter bores 19, 20 there is reciprocably disposed a roller hydraulic lifter 26 having a body 27 with upper and lower lands 28, 30 closely guided in the respective bore 19 or 20. A roller 31 is mounted at the lower end of each lifter to ride on a cam 32 of the engine camshaft for actuation of the respective lifter thereby. A push rod seat 34 or other suitable means for connecting the lifter with the other valve gear is located within the body, optionally near the upper end thereof. The seat may form a part of hydraulic lash adjuster means contained within the body 27.

Figure 3:
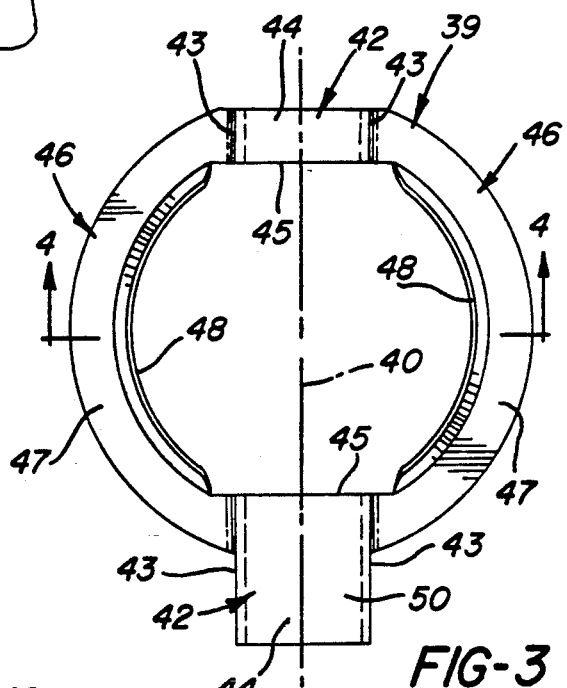
FIG. 3 is a plan view of the retainer clip used in the embodiment of FIGS. 1 and 2.
Figure 4:
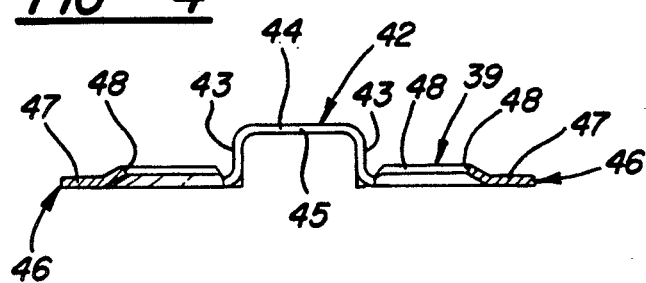
FIG. 4 is a cross-sectional view of the retainer clip from the line 4—4 of FIG. 3.

Above the upper land 28, each lifter body has a reduced diameter upper end 35 preferably having a pair of opposed flats 36 and an annular groove 38 below the top and intersecting the flats 36. A retainer clip 39, preferably formed of spring steel and shown in detail in FIGS. 3 and 4, is mounted on the upper end 35 of each lifter body 27. The clip snaps into the groove 38 and engages the flats 36 to fix its position on the body 27.

Each retainer clip comprises an endless ring formed of resiliently flexible sheet material, preferably spring steel or the like. On diametrically opposed portions along a diameter 40, the ring defines a pair of raised hat sections 42 each formed by spaced parallel sides 43 connected at their distal or top ends by a strap 44. The inner ends 45 of the hat sections are squared and parallel. The two hat sections are interconnected by arches 46 extending arcuately between bottoms of the arcuately adjacent sides of the diametrically spaced hat sections. The arches 46 each include an outer ringlike flat portion 47 and an inner edge 48 preferably angled upward at an angle of about 30° or more, up to about 50°. This stiffens the arches as well as aiding installation of the clip 39 on the lifter body 27.

The outer end of at least one of the hat sections is extended radially outward to form a tang 50 that, in assembly, is received in a slot 51 cut axially through the inner wall of the lifter gallery at each counterbore 25.

In use, the clip 39 is installed on the lifter body by laying the arches against the top of the body upper end 35 so that the angled inner edges 48 contact the outer periphery of the upper end 35 and the squared inner ends 45 of the hat sections 42 are aligned with the flats 36. The angled inner edges 48 act as chamfers to center the clip 39 against the upper end. Pressing down on the hat sections 42 then causes them to flex slightly, allowing the inner edges 48 of the arches 46 to spring outward slightly so they can slide along the outer diameter of the upper end 35 until they snap into the groove 38. The clip is then fixed in position by retention of the edges 48 in the groove 38 and engagement of the squared inner ends 45 of the hat sections 42 with the flats 36 on the lifter body.

The lifter assembly is then ready for installation in the engine by inserting the lifter, roller end first, into the associated lifter bore 19 or 20. The tang 50 is then guided into a slot 51 in the wall of the lifter gallery 12 in which the parallel sides 43 of the tang 50 thereafter slide. The lifter is thereby prevented from substantial rotation in the bore and is maintained in a position with the roller 31 aligned with the cam 32 for proper low friction roller follower action.

Figure 2:
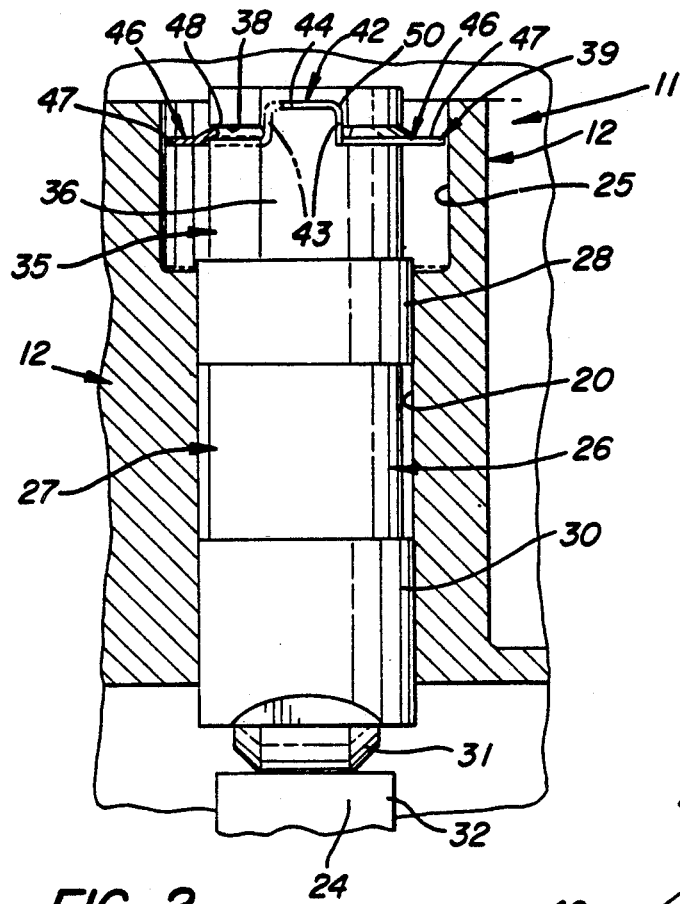
FIG. 2 is a cross-sectional view from the plane of the line 2—2 of FIG. 1 showing the lifter as assembled in the lifter gallery bore.

If the inner diameter of the counterbore 25 is made only slightly larger than the installed outer diameter of the clip arches, the counterbore will act as a guard to prevent the clip from opening sufficiently to escape from the groove and thus retention of the clip on the lifter body is assured. FIG. 2 best illustrates this optional feature. it is apparent that either the counterbore 25 or the reduced diameter of the lifter upper end 35 could be eliminated by changing the other since it is the difference between these two diameters which determines the clip clearance and not the manner in which this difference is created. However, other reasons may call for including both these features.

The invention thus provides a lifter which is easily installed in or removed from the engine without the removal of components other than as needed to reach the installed lifter location. No additional pieces are required other than the single retainer clip on each lifter. The externally mounted clip is positively retained by the snap action of the arches, inner edges 48 and guidance of the hat sections 42 on the body flats 36. Installation of the clip is facilitated by the upturned inner edges 45 which both stiffen the arches and act as a chamfer to guide the clip over the body. Flexing of the strap 44 portions allow the arches to move apart sufficiently to slide the clip along the body until the edges 48 snap into the groove 38. Low wear of the tang 50 in the slot 51 is aided by engagement for guidance of the wide plane surfaces of the sides 43 against the slot edges. Finally, the slots 51 are located in the inner walls of the lifter gallery 12 being cut laterally across the longitudinal direction of the associated cylinder bank in this engine embodiment as the most practical orientation, since the misalignment, or staggering, of adjacent lifter bores would make forming of longitudinally extending slots difficult or impossible. The slots are preferably made by gang sawing although other methods of forming may be used.

While the clip and cam follower assembly of this invention are disclosed in the form of a valve lifter applied in a particular engine embodiment, it should be understood that they could also be applied in many other environments where roller followers are applicable in engines and otherwise. Accordingly it is intended that the invention not be limited to the disclosed embodiment, but that it have the full scope permitted by the language of the following claims.

What is claimed is:

1. A roller follower assembly comprising
   a generally cylindrical body having a roller rotatably mounted near one end,
   an opposite end having an annular groove formed adjacent thereto, and
   a retainer clip comprising an endless ring having portions with inwardly extending radially opposed inner edges engaging the groove for retention of the clip on the opposite end, said inner edges being connected with flexible portions for expanding the distance between the edges during installation of the clip on the body.

2. An engine having a cam follower housing with at least one follower bore with an axial slot along one wall,
   a roller follower assembly having a generally cylindrical body reciprocable in the bore and a roller rotatably mounted near one end of the body, the body having an opposite end with an annular groove formed on an outer surface adjacent to said opposite end,
   a retainer clip having opposed inner edges engaging the groove for retention of the clip on the opposite end, said inner edges being connected with flexible portions for expanding the distance between the edges during installation of the clip on the body, and the clip having a tang extending radially beyond the body and having laterally spaced parallel sides extending into the axial slot in the housing, and
   means fixing the clip to the body to prevent relative rotation thereof whereby the follower is restrained from rotation in the follower bore.

3. An engine as in claim 2 wherein the engine has a plurality of longitudinally spaced follower bores, each with an axial slot and each having therein such a roller follower assembly.

4. An engine as in claim 3 wherein each axial slot is formed laterally across the longitudinal direction of the spaced follower bores.

5. An engine as in claim 4 wherein the longitudinally spaced follower bores are longitudinally slightly misaligned such that the lateral orientation of the axial slots is particularly advantageous.

6. The invention as in claim 2 wherein said retainer clip comprises a closed ring made of strong but flexible sheet material, said ring including
   a pair of diametrically opposite hat sections having upwardly extending sides with upper edges connected by a strap, and
   a pair of arches arcuately interconnecting bottoms of circumferentially adjacent sides of the pair of hat sections, said arches having inner edges extending inward for engagement with the body groove, wherein the inner edges are angled upward,
   at least one of the hat sections extending radially outward of the arches to define the tang with flexibly interconnected sides.

7. The invention as in claim 6 wherein the upward angle is in the range of from about 30°–50°.

8. The invention as in claim 6 wherein said parallel sides of the tang are parallel with a central axis through the clip.

9. The invention as in claim 6 wherein said material is a spring steel.

10. A roller follower assembly comprising a generally cylindrical body having a roller rotatably mounted near one end, an opposite end having an annular groove formed adjacent thereto, and a retainer clip having opposed inner edges engaging the groove for retention of the clip on the opposite end, said inner edges being connected with flexible portions for expanding the distance between the edges during installation of the clip on the body, wherein said retainer clip comprises a closed ring made of strong but flexible sheet material, said ring including a pair of diametrically opposite hat sections having upwardly extending sides with upper edges connected by a strap, and a pair of arches arcuately interconnecting bottoms of circumferentially adjacent sides of the pair of hat sections, said arches having said inner edges extending inward to engage said body groove.

11. The invention as in claim 10 wherein the body opposite end has laterally opposite flats extending to the annular groove and at least the sides of each of the hat sections have inner ends that are square and parallel with those of the other hat section for engagement with the flats on the body.

12. The invention as in claim 10 wherein said inner edges are angled upward.

13. The invention as in claim 12 wherein the upward angle is in the range of from about 30°-50°.

14. The invention as in claim 10 wherein said sides of the tang are parallel with one another and with a central axis through the clip.

15. The invention as in claim 10 wherein said material is a spring steel.

* * * * *